United States Patent
Kaplita et al.

(10) Patent No.: US 11,290,862 B2
(45) Date of Patent: Mar. 29, 2022

(54) METHODS AND SYSTEMS FOR GENERATING TIME-SYNCHRONIZED AUDIO MESSAGES OF DIFFERENT CONTENT IN A TALKGROUP

(71) Applicant: MOTOROLA SOLUTIONS, INC., Chicago, IL (US)

(72) Inventors: Grzegorz Kaplita, Rzeszow (PL); Wojciech Kucharski, Rzeszow (PL); Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/954,480

(22) PCT Filed: Dec. 27, 2017

(86) PCT No.: PCT/PL2017/050070
§ 371 (c)(1),
(2) Date: Jun. 16, 2020

(87) PCT Pub. No.: WO2019/132681
PCT Pub. Date: Jul. 4, 2019

(65) Prior Publication Data
US 2021/0084474 A1 Mar. 18, 2021

(51) Int. Cl.
*H04W 4/90* (2018.01)
*G06Q 50/26* (2012.01)
(Continued)

(52) U.S. Cl.
CPC ............. *H04W 4/90* (2018.02); *G06Q 50/26* (2013.01); *H04L 65/601* (2013.01); *H04W 4/06* (2013.01); *H04W 4/18* (2013.01); *H04W 56/001* (2013.01)

(58) Field of Classification Search
USPC .................................................... 455/404.01
See application file for complete search history.

(56) References Cited

U.S. PATENT DOCUMENTS 7,899,193 B2  3/2011 Bekiares et al.
8,111,843 B2  2/2012 Logalbo et al.
(Continued)

OTHER PUBLICATIONS

Jim Edkins et al., "Mode Determination for Talkgroup Services", ip.com Journal, ip.com I nc., West Henrietta, NY, US, Aug. 19, 2002 (Aug. 19, 2002), XP013004272, ISSN: 1533-0001—p. 244, left-hand column, paragraph 1 right-hand column, paragraph 5 (4 pages).

(Continued)

*Primary Examiner* — Maria El-Zoobi
(74) *Attorney, Agent, or Firm* — Michael Best & Friedrich LLP

(57) ABSTRACT

Methods and systems for generating time-synchronized audio messages of different content in a talkgroup. One system includes an electronic computing device that includes an electronic processor configured to generate first public safety incident information as a function of context information of a first member of a talkgroup, and second public safety incident information as a function of context information of a second member of the talkgroup. The second public safety incident information is different than the first public safety incident information. The electronic processor is further configured to generate a first audio message including the first public safety incident information sized according to a time window and a second audio message including the second public safety incident information sized according to the time window such that a playback time of the first audio message is approximately the same as a playback time of the second audio message.

20 Claims, 5 Drawing Sheets

(51) Int. Cl.
   *H04L 29/06*    (2006.01)
   *H04W 4/06*     (2009.01)
   *H04L 65/60*    (2022.01)
   *H04W 4/18*     (2009.01)
   *H04W 56/00*    (2009.01)

(56) References Cited

U.S. PATENT DOCUMENTS 8,359,382 B1 *   1/2013   Gailloux .............. H04L 65/60
                                                       709/223
   8,792,473 B2     7/2014   Bekiares et al.
   2004/0154022 A1  8/2004   Boss et al.
   2007/0202907 A1* 8/2007   Shaffer ............... H04W 4/08
                                                       455/518
   2015/0201316 A1* 7/2015   Khatibi .............. H04W 4/029
                                                       455/404.2
   2017/0034263 A1  2/2017   Archambault et al.

OTHER PUBLICATIONS

International Search Report and Written Opinion dated Jun. 29, 2018 for related International Application No. PCT/PL2017/05007 (16 pages).

* cited by examiner

METHODS AND SYSTEMS FOR GENERATING TIME-SYNCHRONIZED AUDIO MESSAGES OF DIFFERENT CONTENT IN A TALKGROUP

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Ski provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
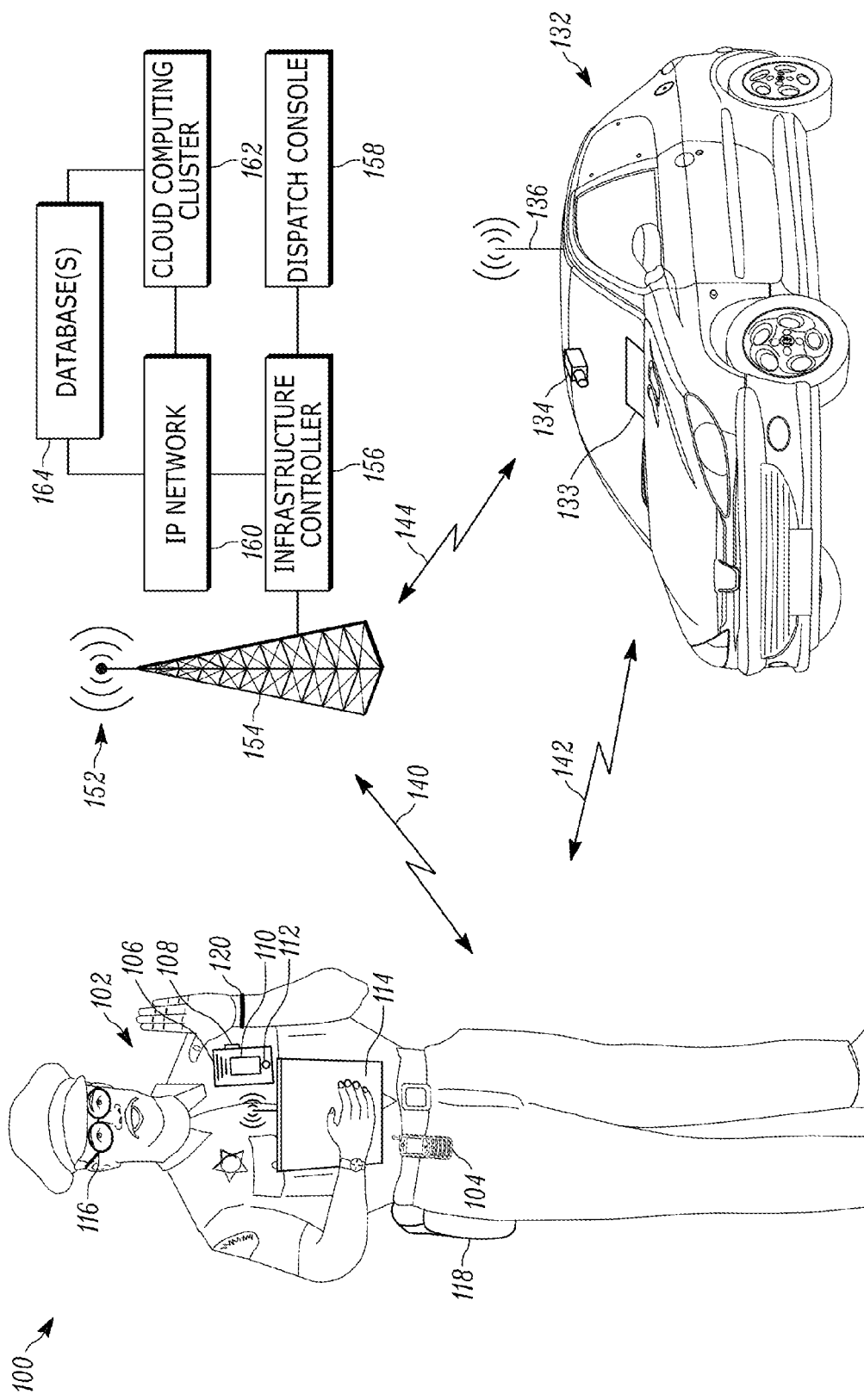
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communication devices often comprise, or provide access to, electronic digital assistants (sometimes referenced as "virtual partners") that may provide the user thereof (such as a first responder) with valuable information. As one example, the electronic digital assistants of some communication devices are configured to receive a user query and execute an action in response to the user query. Often times, communication devices are affiliated with or assigned to one or more talkgroups to allow the communication devices within the talkgroup to communicate with each other. For example, a talkgroup is a virtual radio channel (a shared channel selected from a group of channels or available frequencies) used for communication between a plurality of communications devices, other devices, or a combination thereof. A talkgroup may be defined or assigned based on various criteria. For example, a talkgroup is established for devices associated with a particular public safety organization or department, a particular incident, a particular member role or designation, or a combination thereof. For example, a talkgroup is related to an organization of first responders, a group of police officers, a fire incident, or a combination thereof. Similarly, a talkgroup may relate to members having the same role or designation (for example, police officer, detective, supervisor, paramedic, firefighter, and the like). As another example, paramedics and firefighters might be grouped into two different talkgroups even though they are responding to the same public safety incident. In some situations, the electronic digital assistant mentioned above monitors talkgroup communications and provides information to the members of the talkgroup as described in greater detail below.

In existing talkgroup communication situations, all communication devices of the talkgroup receive identical communication. For example, when a first member speaks into his or her communication device to transmit voice data to the talkgroup, every communication device of the talkgroup outputs the voice data, for example, via a speaker. Additionally, while a talkgroup communication is occurring, the members of the talkgroup are unable to start a different talkgroup communication. Continuing the above example, while the voice data of the first member is being transmitted to and output by the communication devices of the talkgroup, another member of the talkgroup cannot begin transmitting second voice data. Rather, the other members of the talkgroup must wait to transmit additional voice data until the voice data of the first member has finished being output.

In some talkgroup situations, it is advantageous to provide different audio messages to different members of the talkgroup. For example, when information is already known by some members of the talkgroup, such information need not be provided to the members that already know the information. As another example, it is advantageous to provide different information to different members of the talkgroup that are performing different tasks to achieve a common goal. However, when different audio messages are provided to different members of a talkgroup, the audio messages may have different playback times (in other words, the audio messages may have different temporal lengths) because the audio messages include different content. Audio messages with different playback times may cause a technical problem in talkgroup communications because a communication device of a first member with a shorter audio message may finish outputting the shorter audio message before a communication device of a second member with a longer audio message has finished outputting the longer audio message. In such a situation, the communication device of the first member may start transmitting another audio message before the communication device of the second member has finished outputting the longer audio message. This situation may cause talkgroup communications on the communication device of the second member to be disrupted because audio data is being transmitted from multiple devices on the same talkgroup communication channel. In other words, when audio messages in a talkgroup communication are not identical, talkgroup communication may be disrupted.

Disclosed are a method, device, and system for an electronic digital assistant to generate time-synchronized audio messages of different content in a talkgroup. By generating such time-synchronized audio messages of different content, the disclosed method, device, and system solve the technical problem of disruption of talkgroup communication when audio messages of different content and different playback time are transmitted to different members of a talkgroup. As explained in greater detail below, the electronic digital assistant transmits different audio messages to different members of a talkgroup while ensuring that the playback time of each audio message is approximately the same to prevent disruption of talkgroup communication. By implementing such functionality, the electronic digital assistant may provide an impression to the members of the talkgroup that all members have received the same message.

One embodiment provides an electronic computing device that includes a transceiver and an electronic processor communicatively coupled to the transceiver. The electronic processor is configured to generate first public safety incident information as a function of context information of a first member of a talkgroup. The electronic processor is further configured to generate second public safety incident information as a function of context information of a second member of the talkgroup. The second public safety incident information is different than the first public safety incident information. The electronic processor is further configured to determine a time window based on at least one of the first public safety incident information and the second public safety incident information. The electronic processor is further configured to generate a first audio message including the first public safety incident information sized according to the time window and a second audio message including the second public safety incident information sized according to the time window such that a playback time of the first audio message is approximately the same as a playback time of the second audio message.

Another embodiment provides a method for generating time-synchronized audio messages of different content in a talkgroup. The method includes generating, with an electronic computing device, first public safety incident information as a function of context information of a first member of the talkgroup. The method further includes generating, with the electronic computing device, second public safety incident information as a function of context information of a second member of the talkgroup. The second public safety incident information is different than the first public safety incident information. The method further includes determining, with the electronic computing device, a time window based on at least one of the first public safety incident information and the second public safety incident information. The method further includes generating, with the electronic computing device, a first audio message including the first public safety incident information sized according to the time window and a second audio message including the second public safety incident information sized according to the time window such that a playback time of the first audio message is approximately the same as a playback time of the second audio message.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1B:
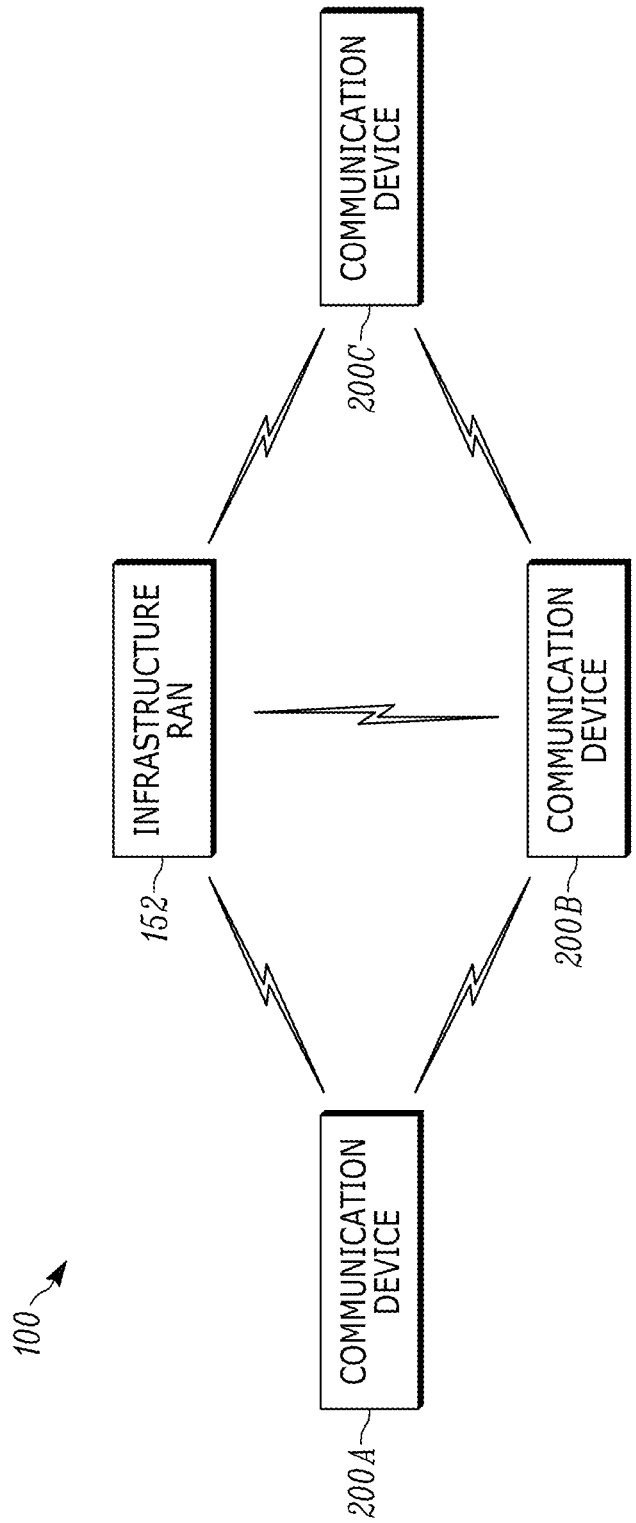

Referring now to the drawings, and in particular FIG. 1A, a communication system diagram illustrates a system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter implements a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1A, the portable radio 104 forms the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 contains a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 contain their own long-range transceivers and communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 is provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 is replaced with a more limited body worn camera that includes the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen is, for example, an LCD screen or an OLED display screen. In some embodiments, a touch sensitive input interface is incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 includes its own long-range transceiver and communicates with other communication devices and/or with the infrastructure RAN 152 or vehicular transceiver 136 directly without passing through portable radio 104. In some embodiments, an additional user interface mechanism such as a touch interface or gesture detection mechanism is provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 is provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 also detects whether the first responder's hand is resting on the weapon even if it has not yet been removed from the holster and provide such information to portable radio 104. In some embodiments, a weapon of the user 102 includes a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 includes its own long-range transceiver and communicates with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and an imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor monitors a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 detects characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device is, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. In some embodiments, the mobile communication device 133 includes the vehicular transceiver 136 and/or the vehicular video camera 134 integrated therewith, and operates to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above is disposed, and similarly communicates with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN provides infrastructure communications to the other, depending on the situation and the types of devices in the VAN and/or PAN and provides interoperability and communication links between devices (such as video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A is equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, is a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 implements a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs are present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller converts the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user indicates to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices dynamically affiliate with a group (and also disassociate with the group) perhaps based on user input, and the switching and/or radio network tracks group membership and routes new group calls according to the current group membership.

In some instances, broadband and narrowband systems are interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1A, such a middleware server is disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers are disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 are maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 is additionally or alternatively a retail communication system including a user 102 that is an employee of a retailer and a vehicle 132 that is a vehicle for use by the user 102 in furtherance of the employee's retail duties (for example, a shuttle or self-balancing scooter). In other embodiments, the communication system 100 is additionally or alternatively a warehouse communication system including a user 102 that is an employee of a warehouse and a vehicle 132 that is a vehicle for use by the user 102 in furtherance of the employee's retail duties (for example, a forklift). In still further embodiments, the communication system 100 is additionally or alternatively a private security communication system including a user 102 that is an employee of a private security company and a vehicle 132 that is a vehicle for use by the user 102 in furtherance of the private security employee's duties (for example, a private security vehicle or motorcycle). In even further embodiments, the communication system 100 is additionally or alternatively a medical communication system including a user 102 that is a doctor or nurse of a hospital and a vehicle 132 that is a vehicle for use by the user 102 in furtherance of the doctor or nurse's duties (for example, a medical gurney or ambulance). In still another example embodiment, the communication system 100 is additionally or alternatively a heavy machinery communication system including a user 102 that is a miner, driller, or extractor at a mine, oil field, or precious metal or gem field and a vehicle 132 that is a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users have multiple associated communication devices 200, for example, as shown in FIG. 1A.

b. Device Structure

Figure 2:
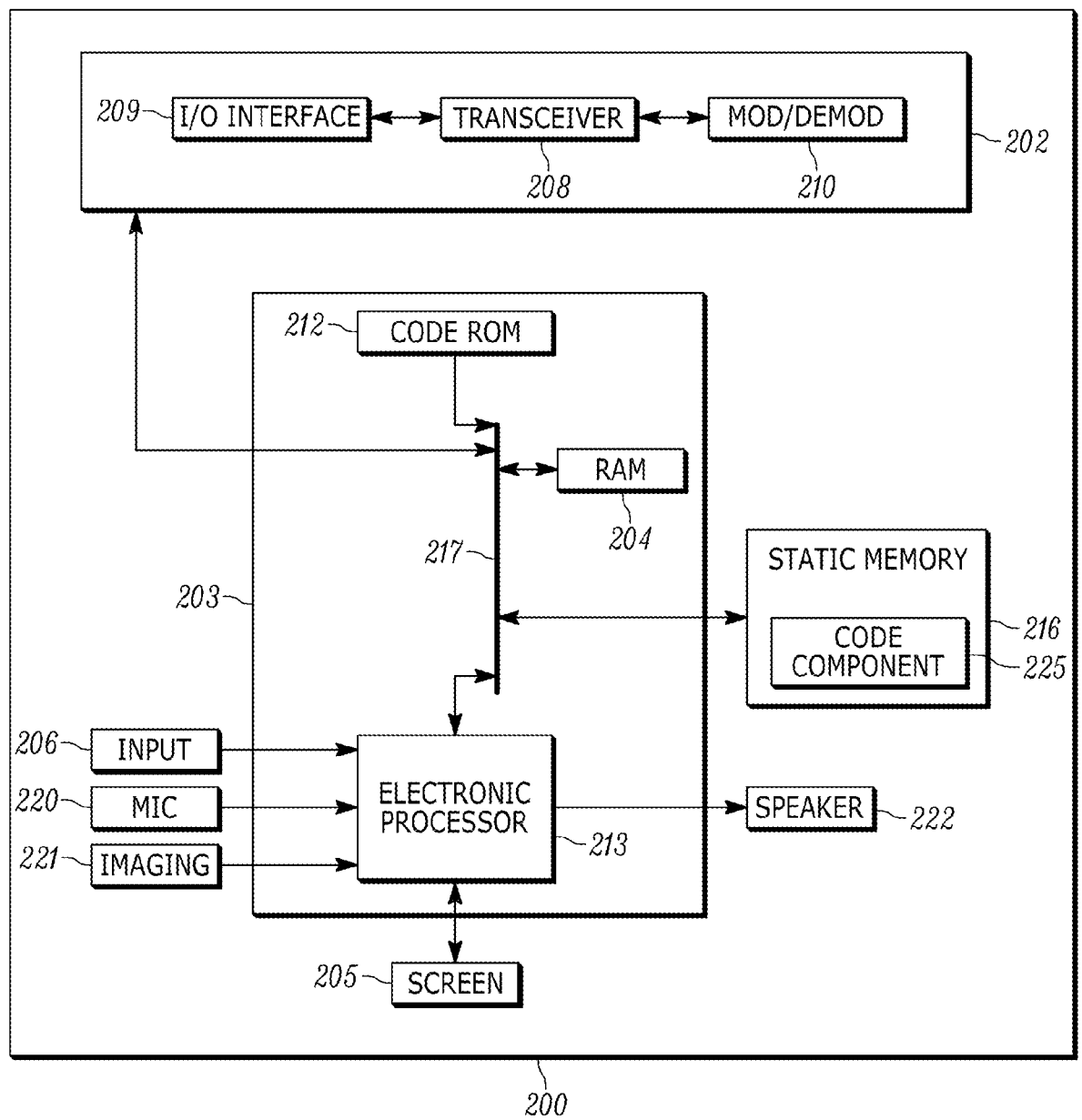
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 is, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or is a distributed communication device across two or more of the foregoing (or multiple of a same type of one of the foregoing) and linked via a wired and/or wireless communication link(s). In some embodiments, the communication device 200 (for example, the portable radio 104) is communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 does not include one or more of the screen 205, microphone 220, imaging device 221, and speaker 222. As another example, in some embodiments, the communication device 200 acting as the portable radio 104 or the RSM video capture device 106 further includes a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203 that includes an electronic processor 213. The communication device 200 may also include one or more input devices (for example, keypad, pointing device, touch-sensitive surface, button, a microphone 220, an imaging device 221, and/or another input device 206) and an electronic display screen 205 (which, in some embodiments, is a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as a the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIGS. 3 and 4 and the accompanying text.

The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Generating Time-Synchronized Audio Messages of Different Content in a Talkgroup In some embodiments, an individual component and/or a combination of individual components of the system 100 may be referred to as an electronic computing device that implements an electronic digital assistant as mentioned above. For example, the electronic computing device is a single electronic processor (for example, the electronic processor 213 of the portable radio 104 or the dispatch console 158). In other embodiments, the electronic computing device includes multiple electronic processors distributed remotely from each other. For example, the electronic computing device is implemented on a combination of at least two of the electronic processor 213 of the portable radio 104, the electronic processor of the dispatch console 158, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102, for example, provides an oral query that is received by the microphone 220 of the communication device 200. The electronic computing device receives signals representative of the oral query (in other words, audio data) from the microphone 220 and analyzes the signals to determine the content of the oral query. For example, the electronic computing device includes a natural language processing (NLP) engine configured to determine the intent and/or content of the oral query. The electronic computing device may also be configured to determine a response to the oral query (for example, by retrieving stored data or by requesting data from the database(s) 164) and provide the response to an output device of the communication device 200 (for example, one or more of the speaker 222 via a generated audio response and the screen 205 via a generated text-based response). In other words, one or more of the communication device 200, embodied in one or more of the communication devices of FIG. 1A, such as the portable radio 104, the dispatch console 158, the infrastructure controller 156, and/or cloud computing cluster 162 may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 submits a text query to the electronic computing device by typing the text query into a hard keyboard input device or a soft keyboard input provided on the screen 205 of the communication device 200. As another example, the user 102 uses the imaging device 221 to capture an image or video of an area and press a hard or soft key to send the image or video to the electronic computing device to, for example, allow the electronic computing device to identify an object in the image or video. As another example, the electronic computing device activates the electronic digital assistant in response to receiving a signal from a sensor of at least one of the biometric sensor wristband 120, the sensor-enabled holster 118, and the like. For example, the electronic computing device activates the electronic digital assistant in response to a heart rate of the user 102 increasing above a predetermined threshold or in response to the user 102 drawing a weapon from the sensor-enabled holster 118. As yet another example, the electronic computing device activates the electronic digital assistant in response to receiving information from another communication device 200 (for example, receiving a new task that is assigned to the user 102). As another example, the electronic computing device activates the electronic digital assistant in response to an event scheduled in a calendar stored in the memory of the electronic computing device.

As mentioned above, the electronic digital assistant may monitor talkgroup communications and may provide information to the members of the talkgroup. In some embodiments, the electronic computing device implementing the electronic digital assistant provides information to the members of the talkgroup in a similar manner as talkgroup communication between the members in the talkgroup. In other words, the electronic computing device may transmit an audio message to the communication devices 200 of the members of the talkgroup such that the speaker 222 of each communication device 200 of the talkgroup outputs the audio message using a voice of the electronic digital assistant. During the output of the audio message, the communication devices 200 of the talkgroup may be unable to start to transmit another audio message (for example, a voice message received via the microphone 220) because the talkgroup communication channel is already in use.

Figure 3:
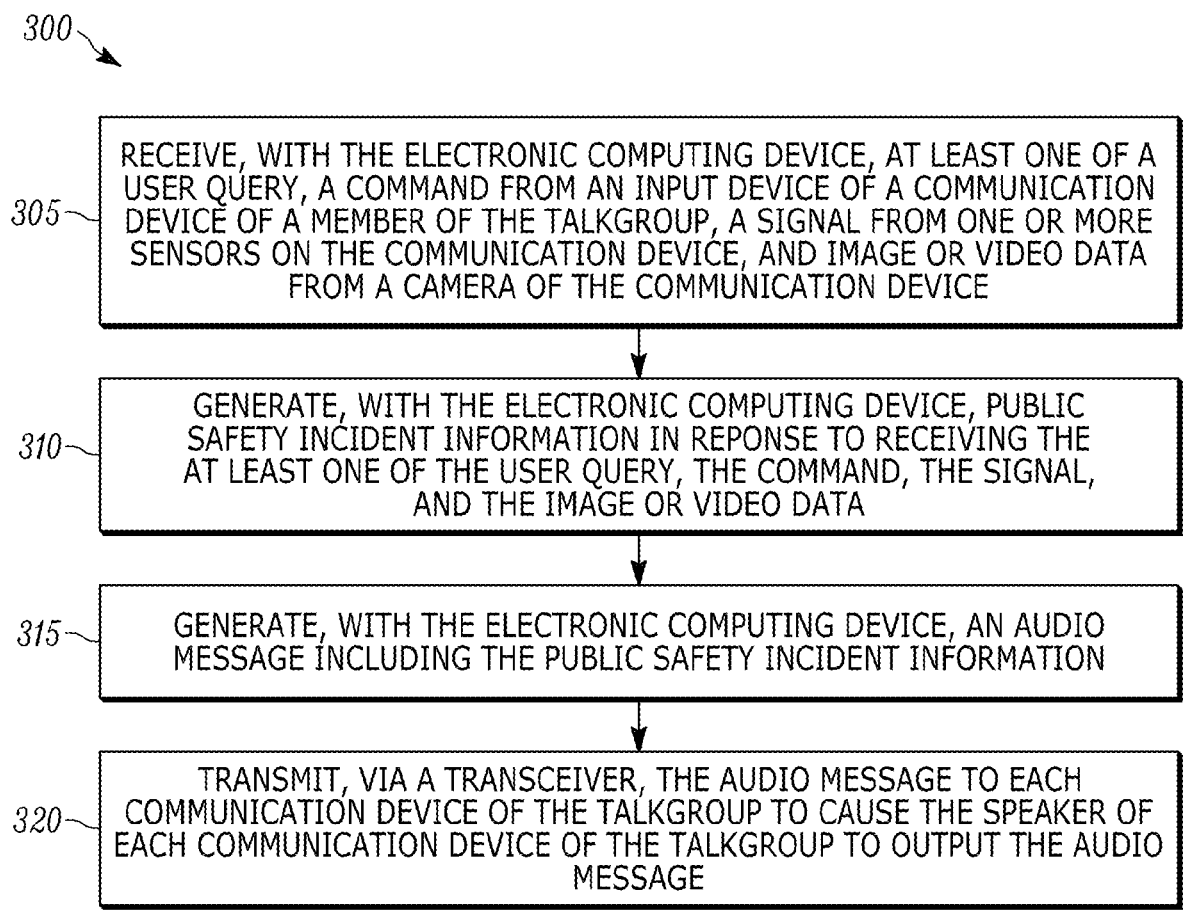
FIG. 3 illustrates a flow chart of a method performed by an electronic digital assistant for providing public safety incident information to communication devices of members of a talkgroup in accordance with some embodiments.

FIG. 3 illustrates a flowchart of a method 300 performed by the electronic computing device for providing public safety incident information to the communication devices 200 of the members of a talkgroup. At block 305, the electronic computing device receives at least one of a user query, a command from an input device of a communication device 200 of a member of the talkgroup, a signal from one or more sensors on the communication device 200 (for example, a sensor on the biometric sensor wristband 120), and image or video data from a camera of the communication device 200 (in other words, from the imaging device 221).

At block 310, the electronic computing device generates public safety incident information in response to receiving the at least one of the user query, the command, the signal, and the image or video data. In some embodiments, public safety incident information is information communicated to public safety personnel (for example, police officers, firefighters, paramedics, and the like) that relates to an incident (for example, a vehicle breakdown, a crime, an attack on an individual or property, and the like) to which public safety personnel are called to assist with the incident. As one example, public safety information includes instructions to the members of the talkgroup to travel to an incident location to assist with an incident.

At block 315, the electronic computing device generates an audio message including the public safety incident information generated at block 310. For example, the electronic computing device generates audio data that is provided to a speaker such that the audio message is audibly conveyable by the speaker (for example, the speaker 222 on the communication device 200 of a member of the talkgroup).

At block 320, the electronic computing device transmits, via the transceiver 208, the audio message to each communication device 200 of the talkgroup to cause the speaker 222 of each communication device 200 of the talk group to output the audio message. In other words, all communication devices 200 of the talkgroup may output the audio message using a voice of the electronic digital assistant to convey the public safety information to the members of the talkgroup. A number of examples of the electronic computing device executing the method 300 are provided below.

As an example where the electronic computing device receives a user query (at block 305), the electronic computing device receives an oral query via the microphone 220 of a communication device 200 of one member of the talkgroup that asks where the nearest hospital is located. In response to the query, the electronic computing device may access the database(s) 164 to determine the location of the nearest hospital (at block 310). The electronic computing device then generates an audio message (at block 315) and transmits the audio message, via the transceiver 208, that causes the location of the nearest hospital to be output by the speaker 222 of each communication device 200 of the talkgroup (at block 320).

As an example where the electronic computing device receives a command from an input device of a communication device 200 of a member of the talkgroup (at block 305), the electronic computing device receives an oral request via the microphone 220 of a communication device 200 to dispatch all first responder units to a location of an incident (in other words, an incident location). In response to the request, the electronic computing device transmits an audio message, via the transceiver 208, that causes an instruction for all units to report to the incident location to be output by the speaker 222 of each communication device 200 of the talkgroup (at block 320).

As another example where the electronic computing device receives a command from an input device of a communication device 200 (at block 305), the electronic computing device receives a command from the dispatch console 158 to transmit information associated with a fire incident that has been input by a dispatcher (for example, building information, number of people inside the building, evacuation commands, and the like) to members of a talkgroup handling the fire (for example, a group of firefighters). In response to the command, the electronic computing device transmits an audio message, via the transceiver 208, that causes the information associated with the fire incident to be output by the speaker 222 of each communication device 200 of the talkgroup (at block 320).

As an example where the electronic computing device receives a signal from one or more sensors on the communication device 200 (at block 305), the electronic computing device receives a signal from a sensor of the biometric wristband 120 of a member of the talkgroup that indicates the member is no longer breathing. In response to the received signal, the electronic computing device may generate an audio message (at block 315) and transmit the audio message, via the transceiver 208, that causes the speaker 222 of each communication device 200 of the talkgroup to output an alert indicating the location of the member and that the member is not breathing (at block 320).

As an example where the electronic computing device receives image or video data from a camera of the communication device 200 (at block 305), the electronic computing device performs image analysis on the image or video data captured by the camera to identify objects and faces of the captured images and video. In such embodiments, the electronic computing device recognizes, for example, a gun being pointed at the camera by a suspect (at block 310). In other words, through image analysis, the electronic computing device may recognize that a gun is being pointed at a first responder. In response to this image analysis, the electronic computing device may generate an audio message (at block 315) transmit the audio message, via the transceiver 208, that causes the speaker 222 of each communication device 200 of the talkgroup to output an alert indicating the location of the first responder and that the first responder has encountered a suspect armed with a gun (at block 320).

The above examples of the electronic computing device generating public safety incident information to be output by the speaker 222 of each communication device 200 of the talkgroup include public safety information that is the same for each member of the talkgroup. Therefore, the playback time of the audio message on each communication device 200 of the talkgroup is the same because the audio message received by each communication device 200 is the same. As noted above, in some talkgroup situations, it is advantageous to provide different audio messages to different members of the talkgroup. However, when different audio messages are provided to different members of a talkgroup, the audio messages may have different playback times which may cause a technical problem in talkgroup communications where multiple communication devices 200 transmit data at the same time over the same talkgroup communication channel.

Figure 4:
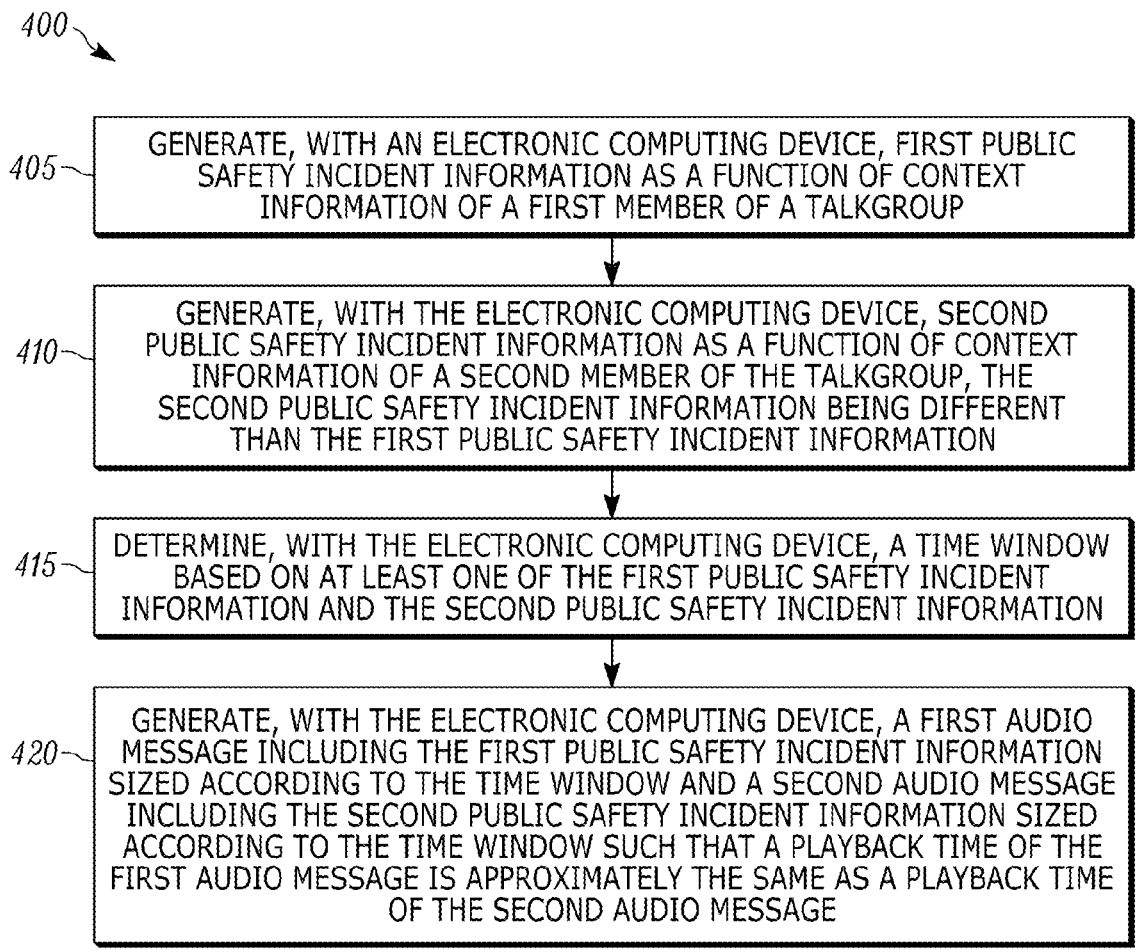
FIG. 4 illustrates a flow chart of a method for generating time-synchronized messages of different content in a talkgroup in accordance with some embodiments.

To solve this technical problem, the electronic computing device that implements the electronic digital assistant performs, in one instance, a method 400 illustrated in FIG. 4. The method 400 is executed by the electronic computing device to generate time-synchronized audio messages of different content in a talkgroup. In performing the method 400, the electronic computing device transmits audio messages of different content to different members of a talkgroup while ensuring that the playback time of each audio message is approximately the same to prevent disruption of talkgroup communication.

FIG. 4 illustrates a flow chart diagram of the method 400 performed by the electronic computing device for generating time-synchronized audio messages of different content in a talkgroup. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 405, the electronic computing device generates first public safety incident information as a function of context information of a first member of a talkgroup. At block 410, the electronic computing device generates second public safety incident information as a function of context information of a second member of the talkgroup. The second public safety incident information generated at block 410 is different than the first public safety incident information generated at block 405. However, in some embodiments, the first and second public safety incident information relate to the same incident.

In some embodiments, context information of a member of the talkgroup (for example, a public safety officer acting as a first responder to an incident) is information indicative of a characteristic of the member while handling incident. In some embodiments, context information of a member of the talkgroup includes at least one of the group consisting of a location of the member, a role of the member, a task assigned to be executed by the member, a skill level of the member, a security privilege level of the member, a past experience of the member, a field of view of a camera of a communication device 200 of the member, and an estimated time of the member to arrive at an incident location. Examples of these types of context information and examples of how the electronic computing device determines the context information are provided below.

In some embodiments, at least some of the context information (for example, the role of the member, the skill level of the member, the security privilege level of the member, the past experience of the member, and the like) is stored on a memory of the electronic computing device and/or is retrieved by the electronic computing device from, for example, the database(s) 164.

In some embodiments, the electronic computing device determines at least some of the context information by receiving information from a component of the communication device 200 of the member. For example, the electronic computing device determines the location of the member using a location determination device on the communication device 200 of the member. As another example, the electronic computing device determines a field of vision of the member based on received image or video data from the smart glasses 116 of the member or another body-worn camera facing forward on the body of the member.

In some embodiments, the electronic computing device determines at least some of the context information by monitoring talkgroup communication between members of the talkgroup. For example, the electronic computing device uses the natural language processing engine described above to determine the task assigned to be executed by the member during a particular incident. For example, during a first incident, a fire chief instructs a first member of the talkgroup to check the first floor of a burning building for trapped victims. During a second incident, the fire chief may instruct the first member to operate a fire hose outside a second burning building. By monitoring talkgroup communication between members of the talkgroup using the natural language processing engine, the electronic computing device may determine the different tasks of the first member at each incident.

In some embodiments, the role of the member includes a rank of the member within a public safety agency (for example, detective, lieutenant, sergeant, chief, and the like). In some embodiments, the role of the member indicates a type of public safety agency for which the member is associated (for example, police department, fire department, hospital, and the like). In some embodiments, the skill level of the member indicates a mental or physical aptitude of the member to perform a particular job. For example, the skill level of the member indicates that the member is a bomb-diffusing expert or a sharp shooter.

In some embodiments, the security level privilege of the member indicates a security level corresponding to each member of the talkgroup. In an example talkgroup, there are three security levels with level three being the most privileged security level to which only the chief and the lieutenants have access. Level two may only include senior officers as well as the level three members, and level one may include all members of the talkgroup. In some embodiments, the electronic computing device provides audio messages of different content to different members of the talkgroup that have different security level privileges.

In some embodiments, the past experience of the member indicates that the member has handled incidents in the past that are similar to the incident that the member is currently handling (for example, incidents at the same location, incidents involving the same suspect, and/or incidents having other similar characteristics).

In some embodiments, the electronic computing device calculates the estimated time of the member to arrive at the incident location using the location of the member (for example, using the location determination device on the communication device 200) and a calculated route from the location of the member to the incident location.

As a function of at least some of the context information explained above, the electronic computing device generates first public safety incident information for a first member of the talk group (at block 405) and second public safety incident information for a second member of the talk group (at block 410). Similar to the method 300 of FIG. 3 explained above, in some embodiments, the electronic computing device generates the first and second public safety incident information in response to receiving at least one of a user query, a command from an input device of a communication device 200 of a member of the talkgroup, a signal from one or more sensors on the communication device 200, and image or video data from a camera of the communication device 200. However, when executing the method 400, the electronic computing device may generate personalized public safety incident information to be transmitted to different members of the talkgroup. For example, the electronic computing device provides certain information to some members of the talkgroup (for example, members with a predetermined security level privilege, skill level, or past experience) while providing other information (for example, general incident information such as weather, traffic conditions, and the like) to other members of the talkgroup (for example, members without the required security level privilege, skill level, or past experience). Accordingly, the electronic computing device may improve communication between members of a talkgroup by providing information to each member that is relevant to the particular member as opposed to providing the same information to all members of the talkgroup. The personalized information may reduce a cognitive load of at least some members of the talkgroup by reducing the amount of irrelevant information that they receive. Along similar lines, the personalized information may reduce mental and physical stress and fatigue that some members of the talkgroup may experience when audio messages are not personalized. Additionally, by executing the method 400, the electronic computing device may provide an impression to the members of the talkgroup that all members have received the same message even though at least some members have received personalized information. Examples of the electronic computing device generating different public safety incident information for different members of the talkgroup are provided below.

Continuing one example from above with respect to FIG. 3 involving the user query about the location of the nearest hospital, the electronic computing device may generate different public safety incident information for different members of the talkgroup as a function of the role and the location of each member of the talkgroup. For example, the electronic computing device recognizes that a first member of the talkgroup is a paramedic who recently departed from the nearest hospital. Thus, the electronic computing device may determine that the paramedic does not need to be informed of the location of the nearest hospital because he or she already knows this information. In other words, as a function of i) the role of the first member indicating that the first member is a paramedic who works for the nearest hospital and ii) the location of the first member indicating that the first member recently departed from the nearest hospital, the electronic computing device may determine that the first member does not need to be informed of the location of the nearest hospital. Accordingly, the electronic computing device may instead generate first public safety incident information for the first member (at block 405) regarding traffic between the location of the paramedic and the incident location. In this example, such information may allow the paramedic to arrive at the incident location more quickly by avoiding traffic while also preventing the paramedic from receiving unnecessary information relating to the location of the nearest hospital that is provided to other members of the talkgroup. Meanwhile, for a second member of the talkgroup, such as the member who provided the user query or another member who may not know the location of the nearest hospital, the electronic computing device may access the database(s) 164 to determine the location of the nearest hospital. The electronic computing device then generates second public safety incident information for the second member (at block 410) that includes the location of the nearest hospital. As illustrated by the above example, the first public safety incident information and the second public safety incident information are different.

Continuing another example from above with respect to FIG. 3 involving the request to dispatch all first responder units to an incident location, the electronic computing device may generate different public safety incident information for different members of the talkgroup as a function of the location of each member of the talkgroup. For example, the electronic computing device determines that the locations of a first member and a second member of the talk group are different. Thus, the electronic computing device may generate first public safety incident information for the first member (at block 405) that instructs the first member to report to the incident location and proceed down Main Street, which is the fastest route to the incident location from the location of the first member. However, the electronic computing device may also generate second public safety incident information for the second member (at block 410) that instructs the second member to report to the incident location and proceed down Second Street, which is the fastest route to the incident location from the location of the second member. In this example, the first and the second member each receive personalized information that is relevant to their respective location to help them proceed to the incident location more quickly.

Continuing yet another example from above with respect to FIG. 3 involving the command to transmit information associated with a fire incident to members of the talkgroup, the electronic computing device may generate different public safety incident information for different members of the talkgroup as a function of the task assigned to be executed by each member of the talkgroup. For example, by monitoring oral communications of the talkgroup between members, the electronic computing device determines that the tasks assigned to be executed by a first member and a second member of the talk group are different. For example, the first member was tasked with performing a rescue on the third floor of a building while the second member was tasked with operation of a fire hose on a fire truck. Thus, the electronic computing device may generate first public safety incident information for the first member (at block 405) that includes information relating to the building layout of the building. However, the electronic computing device may also generate second public safety incident information for the second member (at block 410) that indicates a second fire truck is being dispatched to the incident location to provide further assistance. In this example, the first and second member only receive personalized information that is relevant to their respective task such that the members are not distracted by extraneous information that is not relevant to their respective task.

Continuing one more example from above with respect to FIG. 3 involving a signal from the biometric wristband 120 that indicates that a member of the talkgroup is no longer breathing, the electronic computing device may generate different public safety incident information for different members of the talkgroup as a function of the received sensor signal itself. For example, the electronic computing device determines that the signal was received from the biometric wristband 120 of a first member of the talkgroup. Because the signal indicates that the first member is not breathing, the electronic computing device may generate first public safety incident information for the first member (at block 405) that includes an audible alert to draw attention to the location of the first member. For example, the first public safety incident information includes audio data that states "help, I'm over here," when the audio data is output by the speaker 222 of the communication device 200 of the first member. Alternatively, the audio data may correspond to a predetermined beeping alert that indicates an officer has been injured. The electronic computing device may also generate second public safety incident information for the remaining members of the talkgroup, including the second member (at block 410), that indicates the location of the first member and that the first member is no longer breathing. In this example, the first member does not receive redundant information that was derived from information that his or her own communication device 200 provided. Rather, the communication device 200 of the first member instead receives public safety incident information that may allow another member of the talkgroup to locate the first member to provide assistance. As explained above, the second member and all other members of the talkgroup receive different public safety incident information that may allow them to locate the first member to provide assistance.

As indicated by the above explanation of blocks 405 and 410, the electronic computing device generates different public safety incident information to be provided to the communication devices 200 of different members of a talkgroup as a function of context information of the respective members of the talkgroup.

At block 415, the electronic computing device determines a time window based on at least one of the first public safety incident information and the second public safety incident information. In some embodiments, the time window is an amount of time that the speaker 222 of the communication device 200 of each member of the talkgroup is allocated to output public safety incident information. For example, for a small amount of public safety incident information, the electronic computing device determines that the time window is two seconds. For a larger amount of public safety incident information, the electronic computing device may determine that the time window is ten seconds. In some embodiments, the electronic computing device determines the time window based on whichever of the first and second public safety incident information includes more information. In other embodiments, the electronic computing device determines the time window based on whichever of the first and second public safety incident information includes less information.

At block 420, the electronic computing device generates a first audio message including the first public safety incident information sized according to the time window. At block 420, the electronic computing device also generates a second audio message including the second public safety incident information sized according to the time window such that a playback time of the first audio message is approximately the same as a playback time of the second audio message. In some embodiments, the term "approximately" indicates that the playback times of the first and second audio messages are close enough in length such that the difference in playback times is imperceptible to a human. In some embodiments, playback times that are approximately the same include playback times that are the same, playback times that are within 50 milliseconds of each other, playback times that are within 100 milliseconds of each other, and the like.

In other words, at block 420, the electronic computing device may alter audio data and modify at least one of the first and second public safety incident information to ensure that the playback time of each of the first and second audio message is approximately the same. Ensuring that the playback times of the first and second audio message are approximately the same prevents disruption of talkgroup communication caused by audio messages of different playback times as explained above.

In some embodiments, the electronic computing device adds periods of silence between words of at least one of the first audio message and the second audio message such that the playback time of the first audio message is approximately the same as the playback time of the second audio message. For example, when the first public safety incident information includes less content than the second public safety incident information, the electronic computing device adds periods of silence between words of the first audio message such that the playback time of the first audio message is approximately the same as the playback time of the second audio message.

Similarly, in some embodiments, the electronic computing device adjusts a frequency of an audio signal of at least one of the first audio message and the second audio message such that the playback time of the first audio message is approximately the same as the playback time of the second audio message. For example, when the first public safety incident information includes less content than the second public safety incident information, the electronic computing device decreases the frequency of the audio signal of the first audio message and/or increases the frequency of the audio signal of the second audio message such that the playback time of the first audio message is approximately the same as the playback time of the second audio message. In other words, the electronic computing device may adjust at least one of a speed at which the first audio message is output on a first communication device 200 (for example, by the speaker 222) and a speed at which the second audio message is output on a second communication device 200 (for example, by the speaker 222) such that the playback time of the first audio message is approximately the same as the playback time of the second audio message.

In some embodiments, the electronic computing device adjusts at least one of verbosity and diction of at least one of the first audio message and the second audio message such that the playback time of the first audio message is approximately the same as the playback time of the second audio message. In some embodiments, the electronic computing device adjusts verbosity by using more or fewer words to convey the same meaning. Similarly, in some embodiments, the electronic computing device adjusts diction by using different words to convey the same meaning (in other words, using synonyms, abbreviations, and the like). For example, when the public safety incident information to be conveyed to a member of the talkgroup is an instruction to report to an incident location, the electronic computing device generates an audio message that states "report to the incident location." Alternatively, the electronic computing device may generate an audio message with adjusted verbosity and/or diction that conveys the same meaning (for example, "assistance needed at the incident location," "go to incident location," or "begin traveling to the incident location to provide assistance").

In some embodiments, the electronic computing device generates at least one of the first and second audio messages such that the first and second audio messages include the same number of syllables. For example, when the audio messages instruct all first responder units to report to an incident location, the first public safety incident information for the first member instructs the first member to report to the incident location and proceed down Main Street while the second public safety incident information for the second member instructs the second member to report to the incident location and proceed down Second Street. In this example, at block 420, the electronic computing device may generate the first audio message for the first member to be "report to the incident location, drive down Main Street." The electronic computing device may generate a similar second audio message for the second member to be "report to the incident location, take Second Street." As shown in this example, different content is included in the first and second audio messages, but the electronic computing device generates the first and second audio messages to include the same number of syllables. Accordingly, when the first and second audio messages are output by the speakers 222 of the communication devices 200 of the respective members of the talkgroup, the first and second audio messages have approximately the same playback time.

In some embodiments, the electronic computing device adjusts the level of detail of at least one of the first audio message and the second audio message. In other words, the electronic computing device at least one of adds additional information to and removes information from at least one of the first audio message and the second audio message such that the playback time of the first audio message is approximately the same as the playback time of the second audio message. For example, when the first public safety incident information includes less content than the second public safety incident information, the electronic computing device adds additional information to the first audio message. For example, when a portion of the second public safety information provides instructions specific to the second member of the talkgroup that are not relevant to the first member of the talkgroup (for example, a name of a drug that is understandable only by a paramedic and not by other members of the talkgroup), the electronic computing device includes additional information in the first audio message to the first member (for example, weather information at the incident location) such that the playback times of the first and second audio messages are the approximately the same.

In such embodiments where the electronic computing device adds additional information to at least one of the first and second audio message, the electronic computing device may provide a technical improvement to the electronic computing device by improving transmission time of other communication methods of the electronic computing device. For example, rather than adding periods of silence or decreasing the frequency of an audio signal of an audio message with less information, the electronic computing device instead adds information from another communication method to the audio message such that the playback times of the first and second audio messages are the same. For example, the other communication method is a private communication method that is not affiliated with the talkgroup (for example, voice mail, a messaging application, and the like). Adding information from another communication method to otherwise unused space of the audio message of the talkgroup communication may allow communication through the other communication method to occur more quickly because the electronic computing device does not have to wait to output the private communication until the talkgroup communication has finished. Additionally, adding information from another communication method to the audio message of the talkgroup communication may free up space in a memory where the additional information was previously stored waiting to be output. Accordingly, in some situations, the electronic computing device synchronizes talkgroup communication with another communication method to provide a technical improvement to one or more communication devices 200 of the communication system 100.

Similar to block 320 of FIG. 3, after generating the first and second audio messages as explained above (at block 420), the electronic computing device transmits, via the transceiver 208, the first audio message to a first communication device 200 of the first member of the talkgroup. The electronic computing device also transmits, via the transceiver 208, the second audio message to a second communication device 200 of the second member of the talkgroup. The speaker 222 of the first communication device 200 is configured to output the first audio message, for example, using a voice of an electronic digital assistant. Similarly, the speaker 222 of the second communication device 200 is configured to output the second audio message. In some embodiments, transmissions to the talkgroup (in other words, transmissions over the talkgroup communication channel) are disabled while the speakers 222 are respectively outputting the first and second audio messages. In other words, the first and second audio messages are treated similarly as typical talkgroup voice communication between members of the talkgroup such that further talkgroup communications do not occur until the first and second audio messages have been respectively output by the speakers 222. In other words, further talkgroup communications over the talkgroup communication channel do not occur until the end of the time window in which the first and second audio messages are output (as determined at block 415).

In some embodiments, the first communication device 200 of the first member and the second communication device 200 of the second member are located outside of acoustic range of each other. In some embodiments, the communication devices 200 of the first member and the second member are outside of acoustic range of each other when the output from the speaker 222 of one of the communication devices 200 of one member cannot be heard by the other member.

For example, depending on a noise level of an environment in which the members are located, the communication devices 200 of the first and second members are located outside of acoustic range of each other when they are twenty meters apart, fifty meters apart, one hundred meters apart, and the like. In some situations, the first and second members of the talkgroup are handling the same incident when their respective communication devices 200 are outside of acoustic range of each other. For example, the first member is a firefighter inside a burning building while the second member is a firefighter operating a fire truck outside of the burning building.

Although the method 400 was described above with respect to a first member of a talkgroup and a second member of a talkgroup, the method 400 may be executed with respect to additional members of the talkgroup. For example, the electronic computing device is configured to generate third public safety incident information as a function of context information of a third member of the talkgroup. Additionally or alternatively, the electronic computing device may transmit at least one of the first audio message and the second audio message to a communication device 200 of a third member of the talkgroup.

Although the method 400 was described above as generating time-synchronized audio message of different content in a talkgroup, in some embodiments, the electronic computing device also generates audio messages of the same content and provides such audio messages to the communication devices 200 of the talkgroup (similar to traditional talkgroup communication). In other words, the electronic computing device is capable of operating in two different modes depending on the information included in the audio message. For example, when the information is useful to all members of the talkgroup, the electronic computing device provides the same audio message to all members of the talkgroup (traditional talkgroup communication mode). However, in other situations where the information is known by one or more of the members of the talkgroup as explained above, the electronic computing device provides personalized messages to at least one communication device of a member of the talkgroup as explained above (personalized communication mode).

In some embodiments, the electronic computing device provides messages to the communication devices 200 of the members of the talkgroup based on a priority of the members. For example, a member with a higher priority preempts a member with a lower priority such that audio messages being transmitted by the communication device 200 of the member with a lower priority are interrupted when the communication device 200 of the member with a higher priority begins transmitting an audio message.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
   a transceiver; and
   an electronic processor communicatively coupled to the transceiver, the electronic processor configured to
      generate first public safety incident information as a function of context information of a first member of a talkgroup,
      generate second public safety incident information as a function of context information of a second member of the talkgroup, the second public safety incident information being different than the first public safety incident information,
      determine a time window based on at least one of the first public safety incident information and the second public safety incident information,
      generate a first audio message including the first public safety incident information sized according to the time window and a second audio message including the second public safety incident information sized according to the time window such that a playback time of the first audio message is approximately the same as a playback time of the second audio message,
      transmit, via the transceiver, the first audio message to a first communication device of the first member, wherein the first audio message is output by the first communication device, and
      transmit, via the transceiver, the second audio message to a second communication device of the second member, wherein the second audio message is output by the second communication device.

2. The electronic computing device of claim 1, wherein at least one of the first communication device and the second communication device are located outside of acoustic range of each other.

3. The electronic computing device of claim 2, wherein a speaker of the first communication device is configured to output the first audio message and wherein transmissions to the talkgroup are disabled while the speaker is outputting the first audio message.

4. The electronic computing device of claim 1, wherein the electronic processor is further configured to generate at least one of the first public safety incident information and the second public safety incident information in response to receiving at least one of a user query, a command from an input device of a communication device of a member of the talkgroup, a signal from one or more sensors on the communication device, and image or video data from a camera of the communication device.

5. The electronic computing device of claim 1, wherein the electronic processor is further configured to adjust at least one of verbosity and diction of at least one of the first audio message and the second audio message such that the playback time of the first audio message is approximately the same as the playback time of the second audio message.

6. The electronic computing device of claim 1, wherein the electronic processor is further configured to add periods of silence between words of at least one of the first audio message and the second audio message such that the playback time of the first audio message is approximately the same as the playback time of the second audio message.

7. The electronic computing device of claim 1, wherein the electronic processor is further configured to adjust at least one of a speed at which the first audio message is output on the first communication device and a speed at which the second audio message is output on the second communication device such that the playback time of the first audio message is approximately the same as the playback time of the second audio message.

8. The electronic computing device of claim 1, wherein the electronic processor is further configured to at least one of add additional information to and remove information from at least one of the first audio message and the second audio message such that the playback time of the first audio message is approximately the same as the playback time of the second audio message.

9. The electronic computing device of claim 1, wherein at least one of the context information of the first member and the context information of the second member includes at least one of the group consisting of a location of the member, a role of the member, a task assigned to be executed by the member, a skill level of the member, a security privilege level of the member, a past experience of the member, a field of view of a camera of a communication device of the member, and an estimated time of the member to arrive at an incident location.

10. A method for generating time-synchronized audio messages of different content in a talkgroup, the method comprising:
  generating, with an electronic computing device, first public safety incident information as a function of context information of a first member of the talkgroup,
  generating, with the electronic computing device, second public safety incident information as a function of context information of a second member of the talkgroup, the second public safety incident information being different than the first public safety incident information,
  determining, with the electronic computing device, a time window based on at least one of the first public safety incident information and the second public safety incident information,
  generating, with the electronic computing device, a first audio message including the first public safety incident information sized according to the time window and a second audio message including the second public safety incident information sized according to the time window such that a playback time of the first audio message is approximately the same as a playback time of the second audio message,
  transmitting, via a transceiver of the electronic computing device, the first audio message to a first communication device of the first member, and
  transmitting, via the transceiver, the second audio message to a second communication device of the second member, wherein at least one of the first communication device and the second communication device are located outside of acoustic range of each other.

11. The method of claim 10, further comprising outputting, with a speaker of the first communication device, the first audio message, wherein transmissions to the talkgroup are disabled while the speaker is outputting the first audio message.

12. The method of claim 10, wherein generating the first public safety incident information and generating the second public safety incident information includes generating, with the electronic computing device, at least one of the first public safety incident information and the second public safety incident information in response to receiving at least one of a user query, a command from an input device of a communication device of a member of the talkgroup, a signal from one or more sensors on the communication device, and image or video data from a camera of the communication device.

13. The method of claim 10, wherein generating the first audio message and generating the second audio message includes adjusting, with the electronic computing device, at least one of verbosity and diction of at least one of the first audio message and the second audio message such that the playback time of the first audio message is approximately the same as the playback time of the second audio message.

14. The method of claim 10, wherein generating the first audio message and generating the second audio message includes adding, with the electronic computing device, periods of silence between words of at least one of the first audio message and the second audio message such that the playback time of the first audio message is approximately the same as the playback time of the second audio message.

15. The method of claim 10, wherein generating the first audio message and generating the second audio message includes adjusting, with the electronic computing device, at least one of a speed at which the first audio message is output on the first communication device and a speed at which the second audio message is output on the second communication device such that the playback time of the first audio message is approximately the same as the playback time of the second audio message.

16. The method of claim 10, wherein generating the first audio message and generating the second audio message includes at least one of adding additional information to and removing information from at least one of the first audio message and the second audio message such that the playback time of the first audio message is approximately the same as the playback time of the second audio message.

17. The method of claim 10, wherein generating the first public safety incident information and generating the second public safety incident information includes generating the first public safety incident information as a function of context information of the first member of the talkgroup and generating the second public safety incident information as a function of context information of the second member of the talkgroup, at least one of the context information of the first member and the context information of the second member including at least one of the group consisting of a location of the member, a role of the member, a task assigned to be executed by the member, a skill level of the member, a security privilege level of the member, a past experience of the member, a field of view of a camera of a communication device of the member, and an estimated time of the member to arrive at an incident location.

18. The method of claim 10, wherein the first audio is output by the first communication device, and wherein the second audio message is output by the second communication device.

19. The method of claim 18, wherein the second audio message is output by the second communication device in synchronization with the first audio message being output by the first communication device.

20. The electronic computing device of claim 1, wherein the second audio message is output by the second communication device in synchronization with the first audio message being output by the first communication device.

\* \* \* \* \*